(12) United States Patent
Gutierrez

(10) Patent No.: US 10,984,458 B1
(45) Date of Patent: Apr. 20, 2021

(54) NETWORK BASED AGE VERIFICATION METHOD

(71) Applicant: Ricardo Andres Alvarez Gutierrez, Fort Walton Beach, FL (US)

(72) Inventor: Ricardo Andres Alvarez Gutierrez, Fort Walton Beach, FL (US)

(73) Assignee: Bankcard USA Merchant Services, Inc., Thousand Oaks, CA (US)

( * ) Notice: Subject to any disclaimer, the term of this patent is extended or adjusted under 35 U.S.C. 154(b) by 462 days.

(21) Appl. No.: 15/273,646

(22) Filed: Sep. 22, 2016

(51) Int. Cl.
| | |
|---|---|
| *G06Q 30/00* | (2012.01) |
| *G06Q 30/06* | (2012.01) |
| *G06K 9/00* | (2006.01) |
| *H04L 29/08* | (2006.01) |
| *G06F 16/951* | (2019.01) |

(52) U.S. Cl.
CPC ....... *G06Q 30/0607* (2013.01); *G06F 16/951* (2019.01); *G06K 9/00268* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,355,992 B1 * | 1/2013 | Haugh | ................... | G07G 3/006 |
| | | | | 705/64 |
| 8,620,666 B1 * | 12/2013 | Whitmore | ............. | H04M 1/271 |
| | | | | 704/273 |
| 10,032,042 B1 * | 7/2018 | Eckel | ................... | G06F 21/6218 |
| 2009/0187417 A1 * | 7/2009 | Lidestri | ................... | G06Q 10/10 |
| | | | | 705/317 |
| 2010/0183199 A1 * | 7/2010 | Smith | ................ | G06K 9/00597 |
| | | | | 382/117 |
| 2016/0125367 A1 * | 5/2016 | Bowles | .............. | G06Q 30/0283 |
| | | | | 705/14.11 |
| 2017/0272418 A1 * | 9/2017 | Kim | ........................ | H04L 63/08 |

OTHER PUBLICATIONS

Mackey, Tim K., Exploring the e-cigarette e-commerce marketplace: Identifying Internet e-cigarette marketing characteristics and regulatory gaps, Sep. 26, 2015, Drug and Alcohol Dependence, vol. 156, pp. 97-103 (Year: 2015).*

* cited by examiner

*Primary Examiner* — Jeffrey A. Smith
*Assistant Examiner* — Timothy J Kang
(74) *Attorney, Agent, or Firm* — Peter Loffler

(57) ABSTRACT

A method whereby the date of birth (age) of a consumer engaging in e-commerce over the Internet is verified. The present invention is launched from a merchant's website when an age sensitive transaction—alcohol or tobacco purchase, access to an adult web site, etc., —is being undertaken. The system first checks to see if the consumer is a known entity with a known date of birth. If the consumer is not known to the system, then the system checks public records from information supplied to the system by the consumer. If the date of birth is still unknown after such a check, the consumer uploads an image of photo identification which is checked for date of birth either via software or manually. Once the date of birth is known, the transaction is approved or denied based on the totality of the facts of the transaction.

7 Claims, 2 Drawing Sheets

NETWORK BASED AGE VERIFICATION METHOD

BACKGROUND OF THE INVENTION

1. Field of the Invention

The present invention relates to an Internet based age verification methodology for use during processing of age restricted e-commerce such as the purchase of tobacco or alcohol or gaining access to adult oriented web sites.

2. Background of the Prior Art

The Internet has fundamentally transformed the manner in which commerce is conducted. What once required a trip to the store, can now be accomplished with a few keystrokes on a computer via what is commonly called e-commerce. Find what you want, type in some personal information, make payment arrangements, such as via a credit card, a checking account, or a third party payment transfer system, and the product is on the way via a delivery service or the service can be immediately accessed. The range of products that can be purchased in this manner is virtually unlimited, from toys, clothes, and food to home improvement vehicles, life-saving medication and even vehicles, as an example. The market for services, such as book reading, premium content access, medical advice, etc., is configured in similar fashion.

One area of e-commerce that warrants special attention is age restricted commerce wherein a consumer for a particular product or service must be of a certain minimum age to engage in such commerce. Alcohol, tobacco and tobacco alternate products and adult oriented web sites are all examples of where a consumer needs to be of a threshold age in most jurisdictions in order to participate in such commerce. The question then becomes of how to verify the potential consumer's age.

In a traditional transaction, the potential consumer produces some form of identification, such as a driver's license, and the clerk checks the identification to ascertain whether the potential consumer meets the age threshold required for the transaction and proceeds accordingly. However, in an online transaction, the face to face nature of a transaction is missing, yet the potential consumer's age must still be verified.

A process is needed whereby a potential consumer's age can be verified in an e-commerce transaction in order to ascertain whether or not the potential consumer meets the minimum age threshold to prosecute the transaction. Such a system must be of such a nature so as to be of a relatively minor burden so as to not discourage properly aged consumers from participating in the transaction. Such a system should rely on readily available technology.

SUMMARY OF THE INVENTION

The network based age verification method of the present invention addresses the aforementioned needs in the art by providing a system whereby a potential consumer's age can be quickly and easily checked to ascertain whether or not the potential consumer is age appropriate for the transaction. The network based age verification method is a relatively simple subroutine in the overall e-commerce transaction and is not unduly burdensome from either a time or effort point of view for the consumer. The network based age verification method relies on common technology readily available to most consumers wherein the needed technology is used in standard fashion so that undue delay or frustration is not experienced.

The network based age verification method comprises the steps of providing a client computer which can be a standard computer (desktop, laptop, etc.), or an electronic handheld device, such as a tablet or smartphone. A merchant computer is provided wherein the client computer interacts with the merchant computer in order to conduct commerce across a computer network. During the transaction, a first data set is sent by the client computer to the merchant computer, the first data set containing an information data item (name and address of customer using the client computer) and an age data item (customer's purported age). A verification computer is provided and controls a searchable client database having a series of client records. During the transaction, once information is obtained about the customer via the client computer, the merchant computer sends a request to the verification computer across the computer network, the request containing the first data set. This request is sent to verify the age of the customer using the client computer and then determine if the verified age meets the minimum age threshold for the transaction being attempted. The verification computer uses the information data item to search clients records within the client database to see if the customer is already known to the verification computer, and if a match is found, uses the age data item to compare the recorded age of the customer within the found client record and sends a response to the merchant computer based on the result of this comparison (age matches or does not match). If a match is not found (customer has not had a previous client record created within the client database), the verification computer uses the information data item to search a third-party database that is not under the control of the merchant computer or the verification computer and if a match is found, uses the age data item to compare against the age found within a third-party record within the third-party database and send the response to the merchant computer based on the result of this comparison (again age matches or does not match. If a match is not found, or if a match is found, but no age information about the customer is found, a photo image (identification such as a government issued identification card (driver's license, for example or book (passport for example)) is uploaded to the verification computer. The verification computer uses the information data item to compare against a first image data item (name and address) extracted from the photo image and the age data item against a second data item (age) extracted from the photo image and sends the response to the merchant computer based on the result of this comparison (again age matches or does not match). The computer network across which the system operates is the Internet. A new client record is created within the client database if a match of the information data item against the client records is not found (no previous record on the particular customer) and if a previous client record of the customer is found, the age of the customer is updated if needed. The photo image maybe uploaded to the verification computer via the client computer or via a separate hand held electronic device—for example, the customer's computer lacks a camera, yet the customer has a smartphone. The verification computer may send a prompt to the hand held electronic device prior to the step of uploading the photo image to the verification computer. The first data item and the second data item are each extracted from the photo image via an appropriate computer vision procedure under control of the verification computer (residing on the verification computer or having the verification computer interact with a separate computer (which may be an independent third party) to launch the computer vision procedure. The photo image may be displayed on a computer display device under control of the verification computer for manual verification.

BRIEF DESCRIPTION OF THE DRAWINGS

Similar reference numerals refer to similar parts throughout the several views of the drawings.

DESCRIPTION OF THE PREFERRED EMBODIMENT

Figure 1:
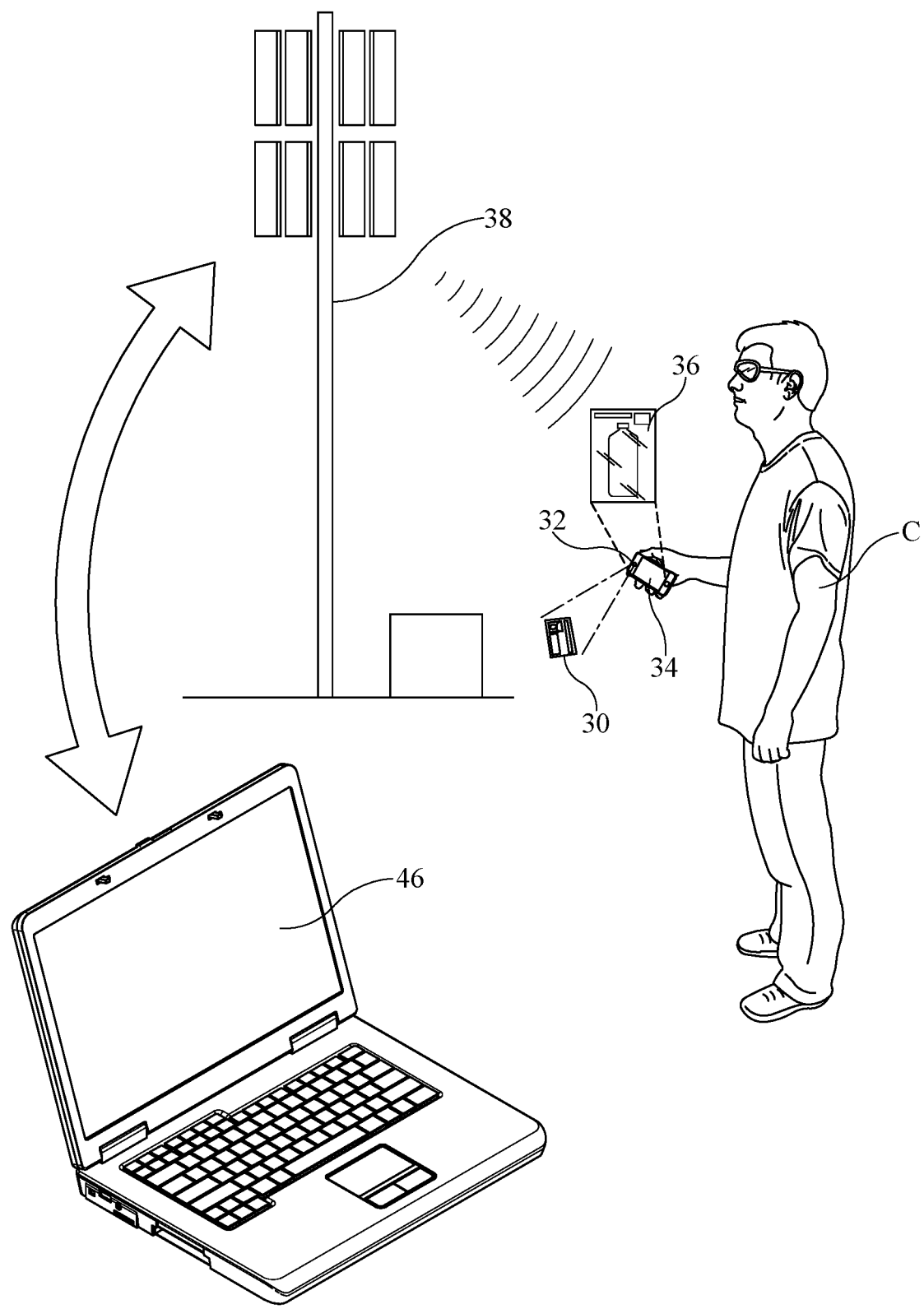
FIG. 1 is an environmental view of the network based age verification method of the present invention being employed for a typical e-commerce transaction.
Figure 2:
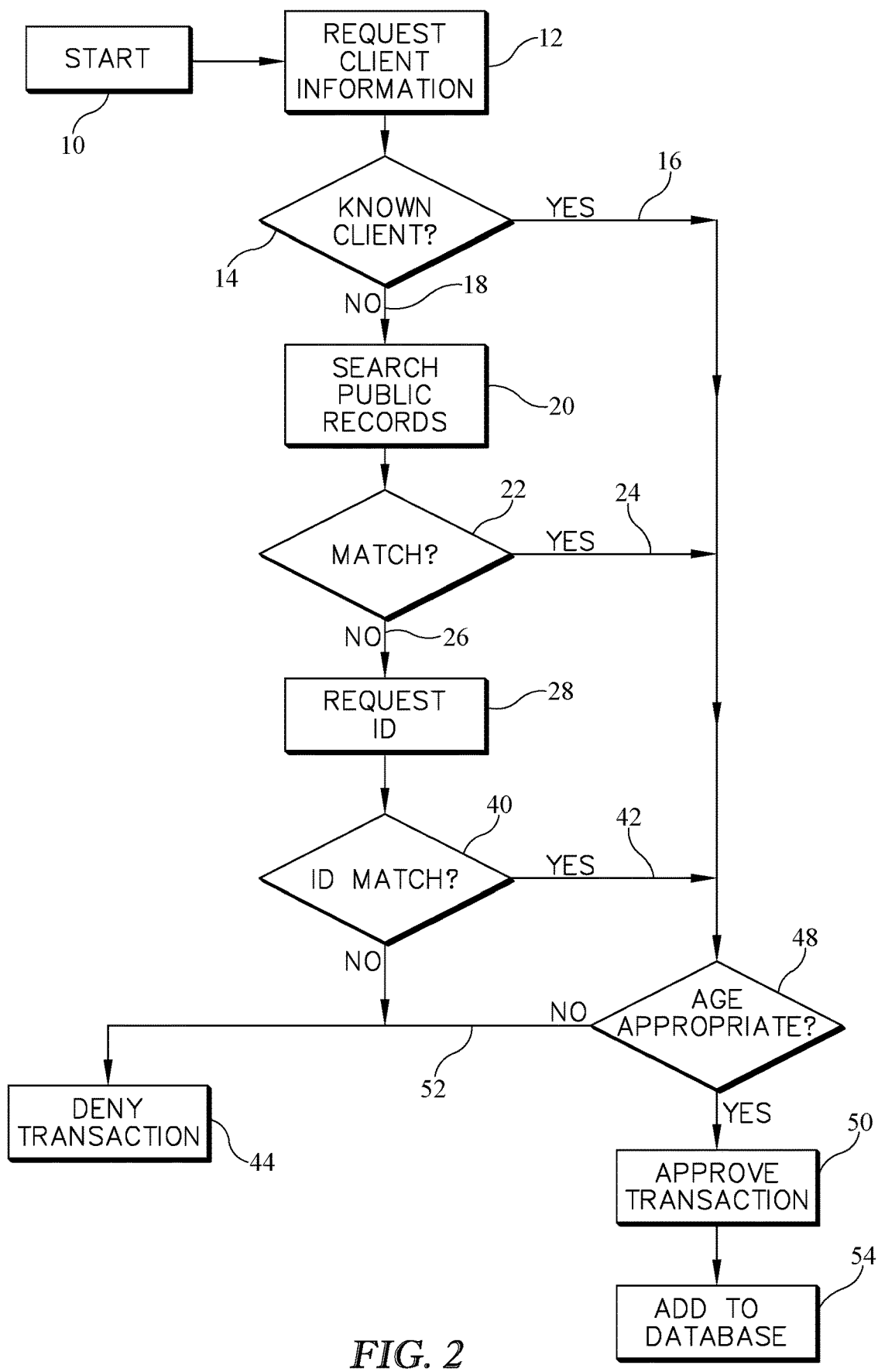
FIG. 2 is a flow chart schematic view of the network based age verification method.

Referring now to the drawings, it is seen that the network based age verification method of the present invention occurs in a typical e-commerce transaction occurring over the Internet, via an appropriate computation device, such as a desktop computer, laptop, computer tablet, smartphone, etc., which transaction is age restricted, such as the purchase of alcohol, tobacco or tobacco alternate products (e.g., vapes), certain medications, adult oriented website access, etc. During the checkout process, when a merchant's computer determines that the transaction being prosecuted is age restricted, the network based age verification method is launched and separate window is opened during checkout. This separate window may either be a popup window or can be a window to which the consumer is transferred during the checkout process. The consumer is transferred to this new separate window at an appropriate point of the checkout process such as when the consumer hits a "place order" or similar button wherein it appears that the consumer is highly desirous of engaging in this particular transaction. If, the network based age verification method is launched, it cannot be bypassed.

Once the network based age verification method is launched 10, a series steps occur. First, the network based age verification method gathers information from the consumer at step 12. Such information includes the consumer's name, entered age (the age the consumer claims to be), and the consumer's address including zip code—other information, such as telephone number and e-mail address can also be gathered. This request for client information 12 can be either requested from the consumer whenever the separate window is opened, or can be automatically copied from the order placement window without further request for input from the consumer or can be a combination thereof—for example, the consumer may not be prompted for age until the network based age verification method is launched so that once the network based age verification method, the consumer is prompted only for this additional information.

Once the requested information from the customer C is obtained, the network based age verification method determines whether the customer is a known client 14 and has been previously age verified. This entered information is be verified against stored information on a client database controlled by the network based age verification method. If a match is found within the client database, then the transaction proceeds to the next step 16, namely verify the age of the consumer. If a match is not made 18, then a search of public records 20 is performed, such public records being available data on the Internet such as via any appropriate third party database. Appropriate search and data mining algorithms are used and may have the ability to account for slight variations in the spelling of the person's name or address as input. The input into this public records search 20 is from the information 12 gathered from the consumer. If the information from the consumer is matched 22 from the public records search 20 and the public records provide an affirmative age (if date of birth is found, an appropriate calculation is made), then the transaction proceeds to the next step 24, namely verify the age of the consumer. If a match is not made 26, then the consumer C is prompted to provide photo identification such as a driver's license 30. The consumer C can either input an image of the photo identification 30 via the camera 32 on his or her computer 34, or a text message can be sent to the potential consumer's smartphone (which may or not be the computer conducting the e-commerce with the merchant, which text message has an appropriate URL that allows the consumer to open the URL and use the consumer's smartphone 34 to snap an image 36 of the photo identification 30 via the smartphone's camera and then have the photo image 36 automatically transferred to the verification computer. The image 30 of the identification 30 is uploaded by the consumer C and transmitted to the network based age verification method via the Internet in appropriate fashion 38. The uploaded image 36 of the photo identification 30 is then compared against the information provided by the consumer 40. If the information on the image 36 of the photo identification 30 matches the information provided by the consumer C, then the transaction proceeds to the next step 42, namely verify the age of the consumer. If the information on the photo identification 30 does not match the information provided by the consumer C, then the transaction is denied 44.

The image 36 of the photo identification 30 of the consumer C can be checked either automatically via a computer vision system—an appropriate software program that is known in the art to extract information including name, address and the date of birth therefrom (with appropriate calculation if needed)—or the image 36 of the photo identification 30 can be checked manually, so that an operator of the network based age verification method receives a display of the image of the photo identification 30 on an appropriate computer screen 46 and visually checks for the date of birth and inputs the date of birth into the network based age verification method in appropriate fashion.

If the network based age verification method proceeds to the verify the age of the consumer 48—is the consumer age appropriate for the particular transaction—the obtained age of the consumer, either via the client database, via public records check, or via photo identification check, is compared against the required age of the transaction, and if the consumer C is age appropriate for the transaction, then the transaction is approved 50, otherwise, the transaction is denied 52. For example, if the consumer C is attempting to purchase alcohol, and the minimum age for alcohol purchase in the consumer's jurisdiction is 21 years of age—or even of the merchant has a blanket policy of selling alcohol to persons who are at least 21 years of age or older as a matter of policy irrespective of jurisdictional rules—then if the network based age verification method determines the consumer is less than 21 years of age, then the transaction is denied 52. If the network based age verification method determines that the consumer C is at least 21 years of age, then the transaction is approved 50. The merchant interacting with the network based age verification method uploads the minimum age to check against by the system.

When a customer enters information during a transaction, then the customer's information, namely customer name, address and other information as desired, is added to the client database 54. Once the network based age verification method makes an age determination, the client database is modified with this further information irrespective of whether the transaction was approved or denied. The actual image of the photo identification, if provided, is not saved.

If the transaction is approved, a unique reference number is generated and supplied to the merchant, and possibly placed on the invoice of the consumer, so that appropriate tracking of the transaction can occur if required.

Each merchant utilizing the network based age verification method has a unique token or identification when interacting with the network based age verification method.

While the invention has been particularly shown and described with reference to an embodiment thereof, it will be appreciated by those skilled in the art that various changes in form and detail may be made without departing from the spirit and scope of the invention.

I claim:

1. A method for information confirmation comprising the steps of:

a client computer stores a first data set, the first data set containing a first information data item and a first date data item;

a merchant computer interacts with the client computer across a computer network and conducts a commerce transaction across the computer network such that the first data set is provided by the client computer to the merchant computer during the conduct of the commerce transaction;

a verification computer controls a client database having a series of client records, each of the client records containing a second information item and a second date data item;

the merchant computer transmits a request to the verification computer across the computer network, the request containing the first data set;

the verification computer receives the request transmitted by the merchant computer and processes the first information data item as a search key and uses the search key to search the client database;

the verification computer compares the first information data item against the second information data item of the client records so that if the first information data item matches the second information item of one of the client records, the verification computer compares the first date data item to the second date data item of that client record and if the first date data item and the second date data item match, the commerce transaction is approved and the approval is transmitted to the merchant computer by the verification computer and the verification computer terminates its processing;

otherwise if the first data item and the second data item do not match each other, the verification computer searches a third party data base not under the control of the merchant computer, the third party database having a series of third party records containing a third information data item and a third date data item such that the verification computer compares the first information data item against the third information data item of each of the third party records so that if the verification computer determines that the first information data item matches the third information item of one of the third party records, the first date data item is compared to the third date data item of that third record by the verification computer and if the first date data item matches the third date data item of that third party record, the commerce transaction is approved and the approval is sent to the merchant computer by the verification computer and the verification computer terminates its processing;

otherwise if the first date data item and the third date data item do not match, the verification computer uploads, from the client computer via the computer network, a photo image data item input into the client computer via a camera communicatively coupled to the client computer, the photo image data item, representing a driver's license, that has a photo image, a fourth information data item, and a fourth date data item such that the verification computer extracts the fourth information data item and the fourth date data item from the photo image data item using a computer vision system and compares the first information data item against the fourth information data item and compares the first date data item against the fourth date data item and if each comparison matches, the commerce transaction is approved and the approval is sent to the merchant computer by the verification computer and if at least one comparison does not match then the commerce transaction is denied and the denial is sent to the merchant computer by the verification computer across the computer network and the verification computer terminates its processing; and the merchant computer receives the commerce transaction approval or denial from the verification computer and continues processing the commerce transaction using the, commerce transaction approval or denial as an input into the commerce transaction processing.

2. The method for information confirmation as in claim 1 wherein the computer network is the Internet.

3. The method for information confirmation as in claim 1 wherein the photo image data set is uploaded to the verification computer via the client computer.

4. The method for information confirmation as in claim 1 wherein the photo image data set is uploaded to the verification computer via a hand held electronic device.

5. The method for information confirmation as in claim 4 wherein the verification computer sends a prompt to the hand held electronic device prior to the step of uploading the photo image data set to the verification computer.

6. The method for information confirmation as in claim 1 wherein the fourth information data item and the fourth date data item are each extracted from the photo image data set via a computer vision procedure under control of the verification computer.

7. The method for information confirmation as in claim 1 wherein the photo image data set is displayed on a computer display device under control of the verification computer.

* * * * *